(12) United States Patent
Breckenridge et al.

(10) Patent No.: US 12,393,873 B2
(45) Date of Patent: *Aug. 19, 2025

(54) CUSTOMIZED PREDICTIVE ANALYTICAL MODEL TRAINING

(71) Applicant: Google LLC, Mountain View, CA (US)

(72) Inventors: Jordan M. Breckenridge, Menlo Park, CA (US); Travis H. K. Green, New York, NY (US); Robert Kaplow, New York, NY (US); Wei-Hao Lin, New York, NY (US); Gideon S. Mann, New York, NY (US)

(73) Assignee: Google LLC, Mountain View, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/348,217

(22) Filed: Jul. 6, 2023

(65) Prior Publication Data

US 2023/0351265 A1 Nov. 2, 2023

Related U.S. Application Data

(63) Continuation of application No. 17/350,991, filed on Jun. 17, 2021, now Pat. No. 11,734,609, which is a
(Continued)

(51) Int. Cl.
*G06N 20/00* (2019.01)
*G06F 18/20* (2023.01)
*G06F 18/21* (2023.01)
*G06N 5/02* (2023.01)
(Continued)

(52) U.S. Cl.
CPC .......... *G06N 20/00* (2019.01); *G06F 18/217* (2023.01); *G06F 18/285* (2023.01); *G06N 5/02* (2013.01); *G06N 7/01* (2023.01); *H04L 67/02* (2013.01)

(58) Field of Classification Search
CPC . G06N 7/01; G06N 20/00; G06N 5/02; H04L 29/08; H04L 67/02
See application file for complete search history.

(56) References Cited

U.S. PATENT DOCUMENTS 5,572,624 A * 11/1996 Sejnoha .................. G10L 15/06
704/251
5,692,107 A 11/1997 Simoudis et al.
(Continued)

OTHER PUBLICATIONS

Apte et al., "Data-intensive analytics for predictive modeling." IBM Journal of Research and Development 47.1, Jan. 2003, 17-23.
(Continued)

*Primary Examiner* — Li Wu Chang
(74) *Attorney, Agent, or Firm* — Fish & Richardson P.C.

(57) ABSTRACT

Methods, systems, and apparatus, including computer programs encoded on one or more computer storage devices, for training predictive models. Multiple training data records are received that each include an input data portion and an output data portion. A training data type is determined that corresponds to the training data. For example, a training data type can be determined by inputting the output data portions into one or more trained predictive classifiers. In other example, the training data type can be determined by comparison of the output data portions to data formats. Based on the determined training data type, a set of training functions are identified that are compatible with the training data of the determined training data type. The training data and the identified set of training functions are used to train multiple predictive models.

18 Claims, 5 Drawing Sheets

Related U.S. Application Data continuation of application No. 15/155,343, filed on May 16, 2016, now Pat. No. 11,042,809, which is a continuation of application No. 14/295,563, filed on Jun. 4, 2014, now Pat. No. 9,342,798, which is a continuation of application No. 13/170,067, filed on Jun. 27, 2011, now Pat. No. 8,762,299.

(51) Int. Cl.
*G06N 7/01* (2023.01)
*H04L 67/02* (2022.01)

(56) References Cited

U.S. PATENT DOCUMENTS

| | | |
|---|---|---|
| 7,349,919 B2 | 3/2008 | Russell et al. |
| 8,209,271 B1 | 6/2012 | Lin et al. |
| 8,209,274 B1 | 6/2012 | Lin et al. |
| 8,229,864 B1 | 7/2012 | Lin et al. |
| 8,250,009 B1 | 8/2012 | Breckenridge et al. |
| 8,301,498 B1 | 10/2012 | Cortes et al. |
| 8,473,431 B1 | 6/2013 | Mann et al. |
| 8,762,299 B1 | 6/2014 | Breckenridge et al. |
| 9,489,366 B2 | 11/2016 | Scott |
| 2003/0176931 A1 | 9/2003 | Pednault |
| 2003/0212851 A1 | 11/2003 | Drescher et al. |
| 2004/0002930 A1 | 1/2004 | Oliver |
| 2004/0249779 A1 | 12/2004 | Nauck |
| 2005/0102303 A1 | 5/2005 | Russell et al. |
| 2005/0114360 A1 | 5/2005 | Russell et al. |
| 2005/0234753 A1 | 10/2005 | Pinto et al. |
| 2005/0273708 A1 | 12/2005 | Motyka et al. |
| 2007/0219433 A1 | 9/2007 | Stupp |
| 2008/0008391 A1 | 1/2008 | Geva et al. |
| 2008/0077544 A1 | 3/2008 | Sueka |
| 2009/0106178 A1 | 4/2009 | Chu |
| 2012/0166156 A1 | 6/2012 | Meng et al. |
| 2013/0268467 A1 | 10/2013 | Yoon et al. |
| 2014/0258185 A1 | 9/2014 | Sharon |

OTHER PUBLICATIONS

Benediktsson et al., "Hybrid Consensus Theoretic Classification" IEEE Transactions on geoscience and remote sensing 35.4, Jul. 1997, 833-843.

Campos et al., "Data-Centric Automated Data Mining" Proceedings of the Fourth International Conference on Machine Learning and Applications (ICLMLA'05), IEEE, Dec. 2005, 8 pages.

Chandra et al. "Sibyl: a system for large scale machine learning" Keynote I PowerPoint presentation, Jul. 28, 2010, 43 pages.

Code.google.com [online], "Google Prediction API (Labs)", Aug. 2011, retrieved on May 18, 2010, retrieved from URL <http://code.google.com/apis/predict/>, 21 pages.

Duchi et al., "Boosting with Structural Sparsity", Proceedings of the 26th International Conference on Machine Learning, Montreal, Canada, Jun. 2009, 297-304.

Evaluating Predictive Models, 36-350, Data Mining, Principles of Data Mining, Chapter 7, Berk chapter 2, Oct. 26-28, 2001, 22 pages.

Hall et al., "The WEKA Data Mining Software: An Update"; SIGKDD Explorations, vol. 11, Issue 1, Jun. 2009, 10-18.

Hutter et al., "Performance Prediction and Automated Tuning of Randomized and Parametric Algorithms,", Principles and Practice of Constraint Programming, Lecture Notes in Computer Science, 2006, 15 pages.

Postema et al., "A Decision Support Tool for Tuning Parameters in a Machine Learning Algorithm", Nanyang Technological University, 1997, 9 pages.

R-project.org [online], "R-Project web pages" Aug. 2011, retrieved on May 18, 2010, retrieved from URL <http://www.r-project.org/>, 190 pages.

Sdn.sap.com [online], "Integrating Real-Time Predictive Analytics into SAP Applications" Dec. 2009, retrieved on Sep. 29, 2011, retrieved from URL <http://www.sdn.sap.com/irj/scn/go/portal/prtroot/docs/library/uuid/a07faefd-61d7-2c10-bba6-89ac5ffc302cQuickLink=index&overridelayout=true>, 1 page.

Statistical Analysis System, "SAS Rapid Predictive Modeler" Dec. 2010, 4 pages.

Uclassify.com [online], "Uclassify web pages" Aug. 2011, retrieved on May 18, 2010, retrieved from URL <http://www.uclassify.com/>, 16 pages.

Weiss "Integrating Real-Time Predictive Analytics into SAP Applications," SAP community Network, 2009, 10 pages.

Wikipedia.org [online], "Active learning (machine learning)" Aug. 2011, retrieved on Aug. 9, 2011, retrieved from URL <http://en.wikipedia.org/wiki/Active learning (machine learning)>, 3 pages.

Zementis.com [online], "Zementis web pages" Aug. 2011, retrieved on May 18, 2010, retrieved from URL <http://www.zementis.com/>, 34 pages.

\* cited by examiner

CUSTOMIZED PREDICTIVE ANALYTICAL MODEL TRAINING

CROSS-REFERENCE TO RELATED APPLICATION

This application is a continuation of U.S. application Ser. No. 17/350,991, titled "Customized Predictive Analytical Model Training," filed Jun. 17, 2021, which is a continuation of U.S. application Ser. No. 15/155,343, now U.S. Pat. No. 11,042,809, titled "Customized Predictive Analytical Model Training," filed May 16, 2016, which is a continuation of U.S. application Ser. No. 14/295,563, now U.S. Pat. No. 9,342,798, titled "Customized Predictive Analytical Model Training," filed Jun. 4, 2014, which is a continuation of U.S. application Ser. No. 13/170,067, now U.S. Pat. No. 8,762,299, titled "Customized Predictive Analytical Model Training", filed Jun. 27, 2011. The disclosure of each of the foregoing applications are incorporated herein by reference in their entirety.

TECHNICAL FIELD

This specification relates to training predictive analytical models.

BACKGROUND

Predictive analytics generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

In general, in one aspect, the subject matter described in this specification can be embodied in a computer-implemented method that includes receiving multiple training data records that each include an input data portion and an output data portion and determining a training data type that corresponds to the training data. Determining the training data type includes: parsing each training data record; comparing the output data portions of the training data records to a plurality of data formats; based on the comparison, determining a match to a particular data format of the plurality of data formats; and determining the training data type based on the particular data format. Based on the determined training data type, a set of training functions are identified that are included in a repository of training functions. The identified training functions are compatible with the training data of the determined training data type. The training data and the identified set of training functions obtained from the repository of training functions are used to train a plurality of predictive models. Other embodiments of this aspect include corresponding systems and computer programs recorded on computer storage devices, each configured to perform the operations described above.

These and other embodiments can each optionally include one or more of the following features, alone or in combination. Identifying the set of training functions can include inputting the determined training data type as input into multiple trained predictive models that are each trained to determine whether a category of training functions is compatible with the training data type. Multiple predictive outputs are received in response from the trained predictive models and the set of training functions are identified based on the predictive outputs. In some implementations, identifying the set of training functions includes identifying one or more constraints associated with the determined training data type; and identifying one or more training functions that each satisfy at least one of the one or more constraints. The identified one or more training functions thereby form the set of training functions.

A score can be generated for each of the trained predictive models, where each score represents an estimation of the effectiveness of the respective trained predictive model. A first trained predictive model can be selected from among the trained predictive models based on the generated scores. In some implementations, the training data records are received over a network from a client computing system, and access to the first trained predictive model can be provided to the client computing system over the network.

In general, in another aspect, the subject matter described in this specification can be embodied in a computer-implemented method that includes receiving multiple training data records that each include an input data portion and an output data portion, and determining a training data type that corresponds to the training data. Determining the training data type can include: inputting the output data portions as input to a trained predictive classifier; receiving predictive outputs from the trained predictive classifier, each predictive output being a label associated with a corresponding output data portion that was input to the trained predictive classifier; and determining the training data type based on the labels provided by the trained predictive classifier. Based on the determined training data type, a set of training functions are identified, that are included in a repository of training functions, and that are compatible with the training data of the determined training data type. The training data and the identified set of training functions obtained from the repository are used to train multiple predictive models. Other embodiments of this aspect include corresponding systems and computer programs recorded on computer storage devices, each configured to perform the operations described above.

These and other embodiments can each optionally include one or more of the following features, alone or in combination. The trained predictive classifier can be trained to classify input as either numerical or not numerical. Training data that has all output data portions labeled as numerical is determined to be regression type training data, and training data that has at least one output data portion labeled as non-numerical is determined to be classification type training data. The trained predictive classifier can be trained to classify input as either text or not text. Training data that has at least one output data portion labeled as text is determined to be classification type training data, and training data that has all output data portions labeled as not text is determined to be regression type training data. The output data portions can be input to one or more additional trained predictive classifiers that are selected based on the determined training data type. Predictive outputs can be received from the one or more additional trained predictive classifiers and, based on the predictive outputs, a sub-type of the training data can be determined. The set of training functions can be identified further based on the determined training data sub-type.

Particular embodiments of the subject matter described in this specification can be implemented so as to realize one or more of the following advantages. Computational resources can be saved by not executing training functions on training data for which the training functions will not succeed in any event, i.e., are not compatible. A fewer number of training functions can be trained on the training data, rather than a larger number that includes some that are destined to fail because they are not compatible with the given training data type.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Methods and systems are described that provide a dynamic repository of trained predictive models, at least some of which can be updated as new training data becomes available. A trained predictive model from the dynamic repository can be provided and used to generate a predictive output for a given input. As a particular client entity's training data changes over time, the client entity can be provided access to a trained predictive model that has been trained with training data reflective of the changes. As such, the repository of trained predictive models from which a predictive model can be selected to use to generate a predictive output is "dynamic", as compared to a repository of trained predictive models that are not updateable with new training data and are therefore "static". The training data provided by the client entity can be determined to be of a particular type, and the determined type can be used to select training functions to use with the training data to generate trained predictive models, which training functions are compatible with the particular type of training data. For example, if the training data includes output data that is of the "label" type, then training functions for classification predictive models are compatible with the training data. By contrast, if the training data includes output data that is of the "numerical value" type, then training functions for regression predictive models are compatible with the training data. Other examples are described below.

Figure 1:
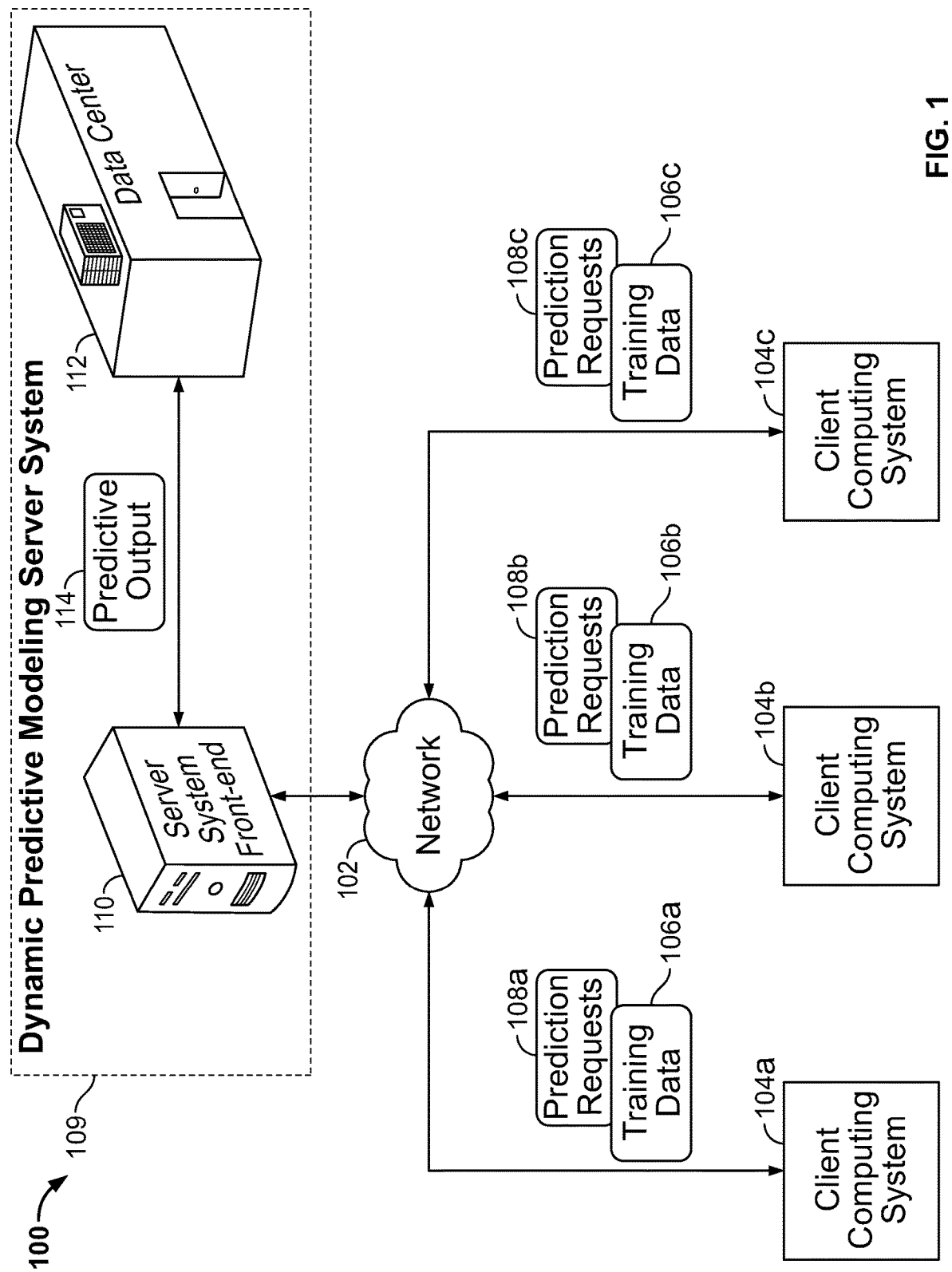
FIG. 1 is a schematic representation of a system that provides a predictive analytic platform.

FIG. 1 is a schematic representation of a system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings, that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
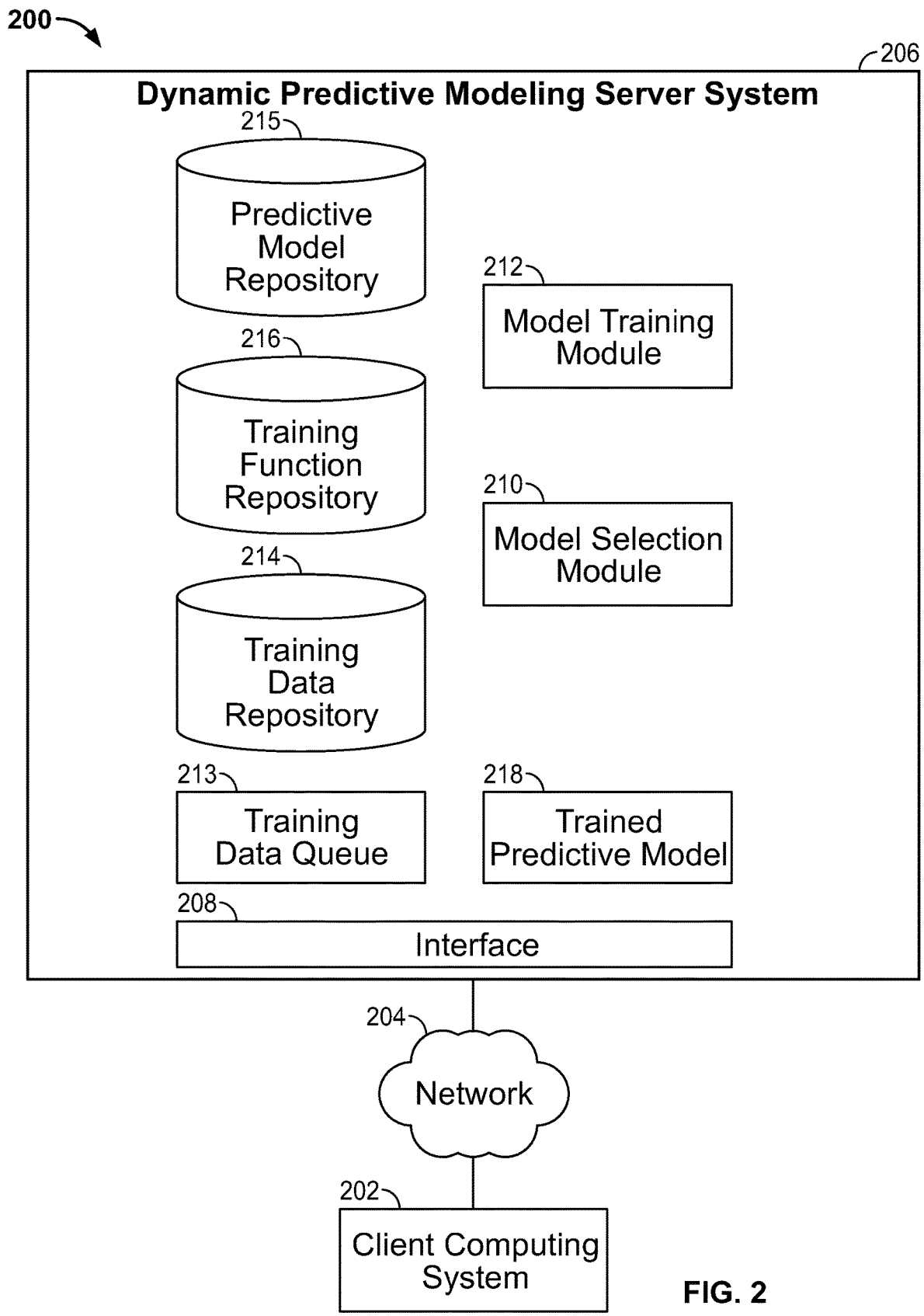
FIG. 2 is a schematic block diagram showing a system for providing a predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the trained model repository 218.

Figure 3:
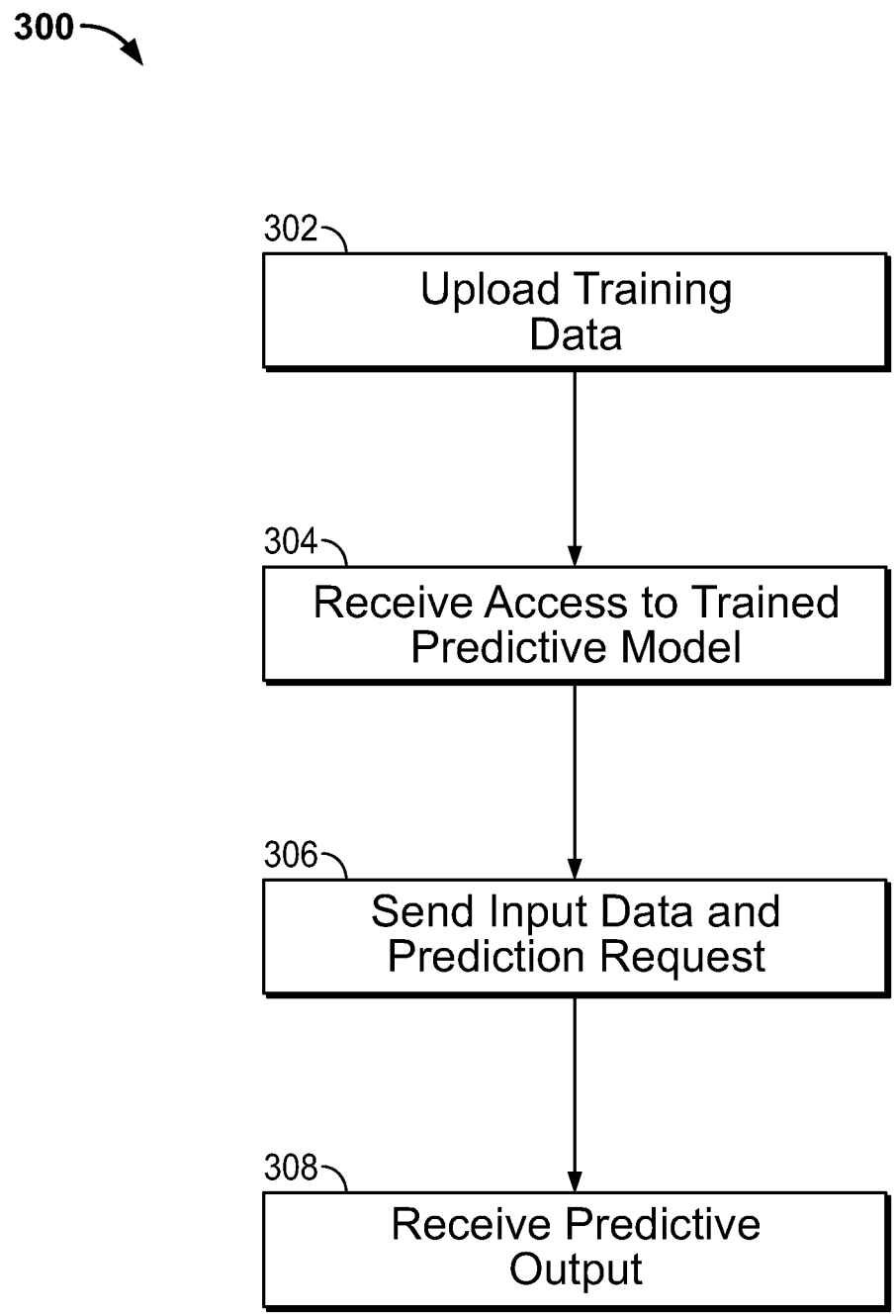
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The process 300 would be carried out by the client computing system 202 when the corresponding client entity was uploading the initial training data to the system 206. The client computing system 202 uploads training data (i.e., the initial training data) to the predictive modeling server system 206 over the network 204 (Step 302). In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218 (Step 304).

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (Step 306). In response, the client computing system receives a predictive output generated by the trained predictive model from the input data (Step 308).

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity. The client entity does not need to be aware of whether a type of model (e.g., classifier, regression model or other model) is the required type of model for the particular output data desired by the client entity. The training data can be automatically "typed" by the system 206 and compatible training functions selected based on the type, as is described in further detail below.

Figure 4:
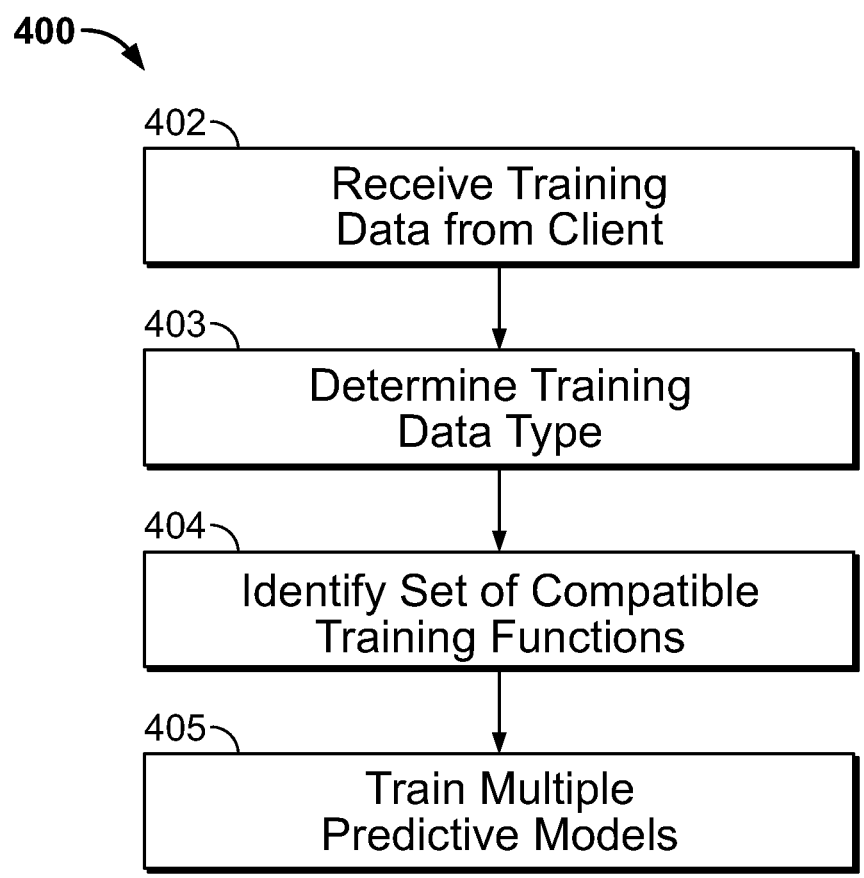
FIG. 4 is a flowchart showing an example process for training a predictive model.

The predictive modeling server system 206 will now be described in more detail with reference to the flowcharts shown in FIGS. 4 and 5. FIG. 4 is a flowchart showing an example process 400 for training multiple predictive models. The process is described in the context of the system 200 of FIG. 2, but it should be understood that the process can be implemented using a differently configured system.

Training data (i.e., initial training data) is received from the client computing system (Step 402). For example, the client computing system 202 can upload the training data to the predictive modeling server system 206 over the network 204 either incrementally or in bulk (i.e., as batch). As described above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, CA. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online used car valuation service. The training data includes multiple records, where each record provides information about a used car, e.g., date of manufacture, name of manufacturer, model, mileage, which is the "input data" portion of the record and a market value for the used car, e.g., $15,000, which is the "output data" portion of the record. The client computing system 202 is interested in predicting market values for used cars based on input data that can be input by a user of the web-based online used car valuation service. In this example, the output data is a numerical value and a regression model is an appropriate model to use for generating such a predictive output, i.e., as compared to a classifier model. The client entity, however, may be unaware that they require a regression model as compared to a classifier model.

A training data "type" is determined (Box 403). In the example predictive modeling server system 206, the model training module 212 can be configured to determine the training data type.

In some implementations, the training data type can be determined to be either classification type or regression type. The model training module 212 can determine whether the output data portions of the training data samples are numerical values, and if so, the type can be determined as regression type and if not, then the type can be determined as classification type. In some implementations, the training data can be parsed and if all characters in an output column are successfully identified as being a numerical value from 0 to 9, e.g., by comparison to a specific format or set of expressions, then the model training module 212 determines the training data type is regression type. In other implementations, the values in the output column can be input into a trained predictive model that is trained to classify input data as either "numerical" or "not numerical". The trained predictive model can thereby be used to label the data in the output column as numerical or not numerical, from which the type can be determined to be regression type. In some implementations, the trained predictive model's predictive output can be "regression type" or "not regression type", based on whether or not numerical values are found. Training data labeled as "not regression type" can be re-labeled as "classification type". In other implementations, the trained predictive classifier model can be trained to classify input to the model (i.e., the data from the training data output column) as text, e.g., characters, strings or combinations of characters and strings. If the data from the training data output column is text, then the training data type is classification type. The predictive output from the trained predictive classifier model can be either "text" or "not text" or can be labeled as "classification type" or "not classification type". If the training data is labeled "not classification type", it can be re-labeled as "regression type".

In other implementations, there can be more specific types of training data identified. For example, although the output column of the training data may be populated with numerical values, i.e., regression type data, the numerical values may be identified as GPS (global positioning system) coordinates, i.e., a sub-type of the numerical value/regression model type. Knowing this further information about the training data type may be beneficial in selecting compatible training functions for the training data. In some implementations, once the training data is determined to be classification or regression type, the output column data can be further input into one or more additional trained predictive classifier models to further determine a sub-type (i.e., more specific type) for the training data. The one or more additional trained predictive classifiers can be selected based on the determined training data type. That is, if the training data is determined to be regression model type, then different additional trained predictive classifiers are used to determine a sub-type than would be used for classification type training data.

In some implementations, to determine if the numerical values are a particular sub-type of regression type data, e.g., GPS coordinates, the numerical values are analyzed to determined (a) if the range of the numerical values falls into −90 to 90 (for latitude) and −180 to 180 (for longitude); and/or (b) if the format of the values corresponds to DD MM SS (i.e., degree, minute, second), DD MM.MMMM or DD.DDDD. A score can be assigned for the numerical values analyzed that indicates how strongly the numerical values are likely to be GPS coordinates. In one example, the score is the ratio of numerical values that match both range and format that correspond to GPS coordinates to the total number of numerical values analyzed. If the score is over a predetermined threshold value, e.g., 85%, then the numerical values can be determined to correspond to the sub-type of GPS coordinates.

In another example, numerical values that have been identified as regression type data can be analyzed to determine whether they correspond to the sub-type of time, and in a particular example, to Unix Epoch Time. The numerical values are analyzed to determine: (a) if the range of the numerical values is positive; (b) if the numerical values represent a time point in the past, i.e., if a numerical value included in training data indicates time, it is more likely to have been collected in the past than in the future; and/or (c) if the numerical values are sorted in an increasing order. Based on the above determinations, a determination can be made whether the numerical values correspond to the sub-type of Unix Epoch Time.

By way of another example, some classification or regression model training functions may be compatible with only certain types of training data. Using regressions models as an example, the following more specific types of training functions may be available for training regression models: can only predict positive values; can predict whole real range values (+/−); only compatible with integers; only compatible with decimals, to name a few examples. Accordingly, after parsing the training data records and comparing the output data portion to a particular format or expression, the available types can be more than just "classification" or "regression", but can also include "regression positive values", "regression integers", "regression decimals", etc., such that compatible training functions can be better identified.

Once a training data type is determined, a set of training functions that are compatible with the training data type are identified (Box 404). In the example predictive modeling server system 206 shown, the model training module 212 can be further configured to identify the set of training functions that are compatible with the training data type. In some implementations, each training function (or a subset thereof) in a training function repository 216 can be queried to determine whether the training function is compatible with training data having the determined training data type. For example, if the training data type is either regression type or classification type, and in a particular example is the regression type, the training functions can be queried as to whether they are compatible with regression type training data. For example, each training function can have a flag that indicates whether the training function should be used for a certain type of training data (e.g., is_regression_algorithm?). If the training data type matches the flag for a particular training function, then that training function is added to the set. As discussed above, there can be additional types as well, e.g., regression decimals, etc. Some training functions can fail or give unexpected results when providing training data of a type that is not compatible with the training function. Providing training functions with training data of an incompatible type can be a waste of system resources and may slow down the overall process of selecting a predictive model. The training functions that positively respond to the query as being compatible with the training data type are the identified set of training functions.

In some implementations, the training data type can be determined, e.g., by parsing and comparing to a set of known formats or expressions (e.g., as described above for GPS coordinates and Unix Epoch Time), or by using a trained predictive classifier model as described above. The training data type can be "text", "numeric integers", "numeric decimals", "numeric GPS coordinates" or the like. The training functions included in the repository can be grouped into categories that include one or more training function. For each category of training functions, there can be a trained predictive model that is trained to test "Will accuracy be increased if training functions in this category are applied to training data of this type?". The training data type can be input to the trained predictive models for the categories and in each case, if the answer is sufficiently yes, i.e., yes with a high enough probability, then the training functions in the category are added to the set of training functions.

In some implementations, given a determined training data type, identifying the set of compatible training functions is a constraint satisfaction problem. That is, some training functions are generic and can be used for almost any training data type, but some are designed for specific training data types, e.g., temporal data, spatial data, textual data, etc. Sometimes multiple constraints may conflict because data type determination is not perfect, and a set of training functions is selected with each constraint. A training data type imposes a constraint (which can be different for different types of training data) and each training function can satisfy all (i.e., for generic) of some (i.e., for specific) constraints. A constraint satisfaction program can be executed, e.g., recursively search and backtrack if stuck, to identify a set of training functions for the determined training data type. If no, or too few training functions are identified, then a constraint that has a lowest confidence score can be relaxed and the search repeated until a desirable number of training functions are identified. Such an approach can maximize the likelihood that the best achieving training function will be included in the set of training functions that are identified.

The set of identified training functions are passed the training data and used to train multiple predictive models (Box 405). In the example predictive modeling server system 206, a model training module 212 is configured to train the multiple predictive models. The multiple predictive models include one or more updateable predictive models and can include one or more static predictive models, as are described further below.

At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Winnow, Support Vector Machines (SVM), Maximum Entropy (MaxEnt) Analogue, Gradient based (FOBOS) and AdaBoost with Mixed Norm Regularization. The training function repository 216 can include one or more of these example training functions.

Although FIG. 4 is described in the context of the dynamic predictive modeling server system 206 of FIG. 2, it should be understood that the techniques described, e.g., for determining a type of training data and then using compatible training functions to generate multiple predictive models, can be used in the context of differently configured systems. For example, these techniques can be used in a local computing system that does not transmit training data over a network, transmit input data and predictive requests over the network and/or transmit predictive outputs over the network, but rather performs some or all of these tasks locally within a computing system.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyperparameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

Figure 5:
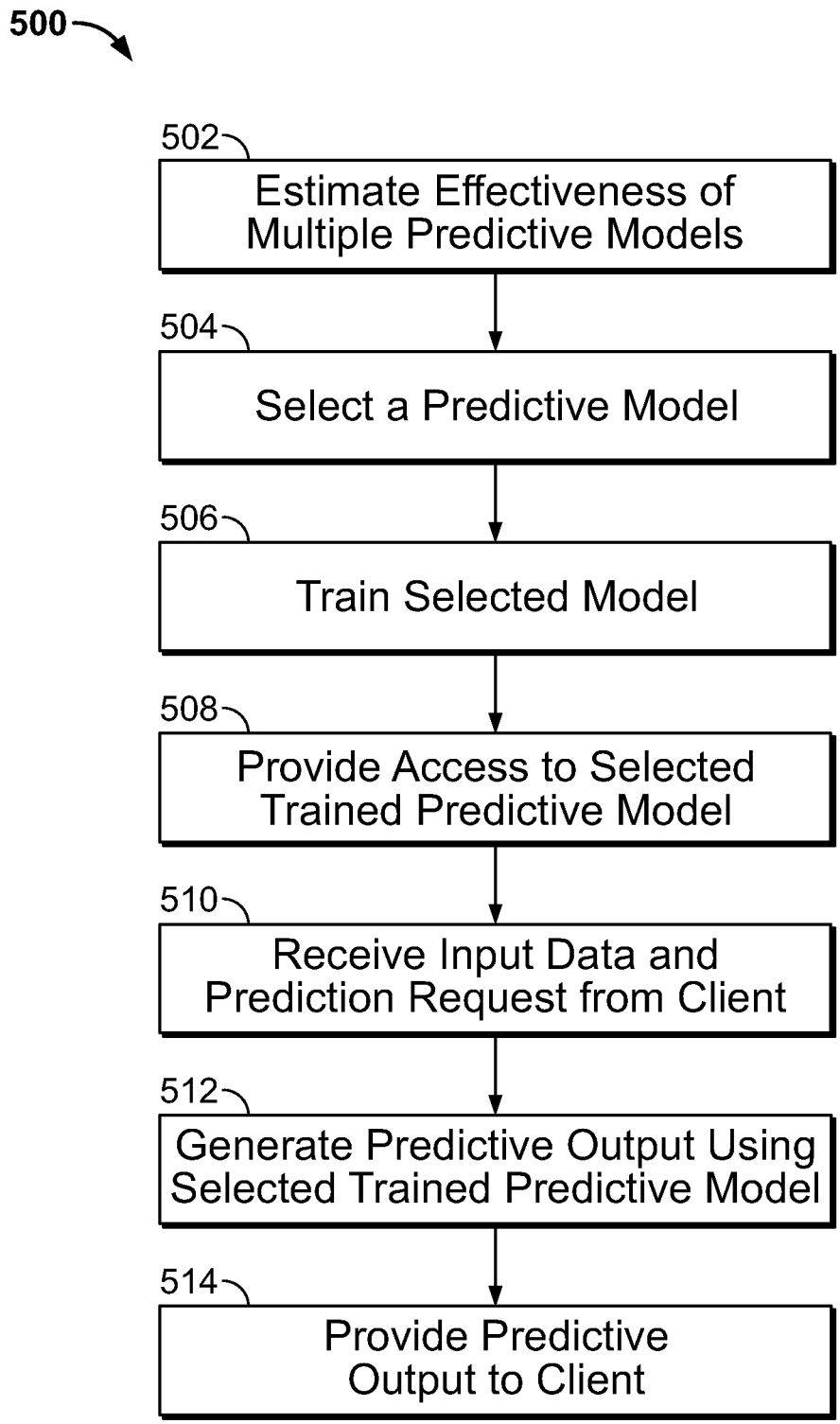
FIG. 5 is a flowchart showing an example process for selecting a predictive model.

FIG. 5 is a flowchart of an example process 500 for selecting a predictive model. That is, from the multiple trained predictive models that are generated by the process 400 described above, a particular trained predictive model is selected that the client computing system can use to generate predictive outputs. For illustrative purposes, the process 500 is described in the context of the system 200 shown in FIG. 2, although it should be understood that a differently configured system can implement the process 500.

For each of the trained predictive models, the effectiveness the trained predictive models is estimated (Step 502). For example, the model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 5, each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (Step 504). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions) (Step 506), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that were trained as described above, some or all of them can be stored in the predictive model repository 215. Each trained predictive model can be associated with its respective effectiveness score. One or more of the trained predictive models in the repository 215 are updateable predictive models. In some implementations, the predictive models stored in the repository 215 are trained using the entire initial training data, i.e., all K partitions and not just K−1 partitions. In other implementations, the trained predictive models that were generated in the evaluation phase using K−1 partitions are stored in the repository 215, so as to avoid expending additional resources to recompute the trained predictive models using all K partitions.

Access to the trained predictive model is provided (Step 508) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202 (Step 510). In response, the input data is input to the trained predictive model 218 and a predictive output generated by the trained model (Step 512). The predictive output is provided; it can be provided to the client computing system (Step 514).

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML, document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   sending, from a client device and to a predictive modeling server system, training data records, wherein:
   each training data record includes an input data portion and an output data portion and the training data records are used to train one of a plurality of predictive models that are each of a different predictive model type;
   the training data records do not specify a predictive model type to be trained on the training data records; and the predictive modeling server is configured to compare the output data portions of the training data records to a plurality of data formats, and based on the comparison, determining a training data type and a corresponding predictive model type to select a predictive model to train on the training data records;

receiving, at the client device and from the predictive modeling server system, access to a selected predictive model that has been trained on the training data records and that executes on the predictive modeling server;

sending, from the client device to the selected predicted model executing on the predictive modeling server, input data records and a prediction request; and receiving, from the selected predictive model, predictive output generated by applying the received input data records to the selected predictive model.

2. The method of claim 1, wherein the training data records are sent through an HTTP web service.

3. The method of claim 1, wherein receiving access to the selected predictive model providing comprises receiving a URL address for accessing the selected predictive model.

4. The method of claim 1, wherein receiving access to the selected predictive model providing comprises receiving an interface configured to interface a trained model repository with a network communicatively coupled to the client device.

5. The method of claim 4, wherein the interface is further configured to interface a training data repository with the network communicatively coupled to the client device.

6. The method of claim 1, wherein the selected predictive model is selected at the predictive modeling server by:
generating a score for each of the plurality of trained predictive models, where each score represents an estimation of the effectiveness of the respective trained predictive model trained on the training data records; and
selecting a first trained predictive model from among the plurality of trained predictive models based on the generated scores.

7. A system comprising:
a client computer device configured to perform operations comprising:
sending, from the client device and to a predictive modeling server system, training data records, wherein:
each training data record includes an input data portion and an output data portion and the training data records are used to train one of a plurality of predictive models that are each of a different predictive model type;
the training data records do not specify a predictive model type to be trained on the training data records; and
the predictive modeling server is configured to compare the output data portions of the training data records to a plurality of data formats, and based on the comparison, determining a training data type and a corresponding predictive model type to select a predictive model to train on the training data records;
receiving, at the client device and from the predictive modeling server system, access to a selected predictive model that has been trained on the training data records and that executes on the predictive modeling server;
sending, from the client device to the selected predicted model executing on the predictive modeling server, input data records and a prediction request; and
receiving, from the selected predictive model, predictive output generated by applying the received input data records to the selected predictive model.

8. The system of claim 7, wherein the training data records are sent through an HTTP web service.

9. The system of claim 7, wherein receiving access to the selected predictive model providing comprises receiving a URL address for accessing the selected predictive model.

10. The system of claim 7, wherein receiving access to the selected predictive model providing comprises receiving an interface configured to interface a trained model repository with a network communicatively coupled to the client device.

11. The system of claim 10, wherein the interface is further configured to interface a training data repository with the network communicatively coupled to the client device.

12. The system of claim 7, wherein the selected predictive model is selected at the predictive modeling server by:
generating a score for each of the plurality of trained predictive models, where each score represents an estimation of the effectiveness of the respective trained predictive model trained on the training data records; and
selecting a first trained predictive model from among the plurality of trained predictive models based on the generated scores.

13. A non-transitory computer-readable medium comprising instructions that, when executed by a client device, cause the client device to perform operations comprising:
sending, from the client device and to a predictive modeling server system, training data records, wherein:
each training data record includes an input data portion and an output data portion and the training data records are used to train one of a plurality of predictive models that are each of a different predictive model type;
the training data records do not specify a predictive model type to be trained on the training data records; and
the predictive modeling server is configured to compare the output data portions of the training data records to a plurality of data formats, and based on the comparison, determining a training data type and a corresponding predictive model type to select a predictive model to train on the training data records;
receiving, at the client device and from the predictive modeling server system, access to a selected predictive model that has been trained on the training data records and that executes on the predictive modeling server;
sending, from the client device to the selected predicted model executing on the predictive modeling server, input data records and a prediction request; and
receiving, from the selected predictive model, predictive output generated by applying the received input data records to the selected predictive model.

14. The non-transitory computer-readable medium of claim 13, wherein the training data records are sent through an HTTP web service.

15. The non-transitory computer-readable medium of claim 13, wherein receiving access to the selected predictive model providing comprises receiving a URL address for accessing the selected predictive model.

16. The non-transitory computer-readable medium of claim 13, wherein receiving access to the selected predictive model providing comprises receiving an interface configured to interface a trained model repository with a network communicatively coupled to the client device.

17. The non-transitory computer-readable medium of claim 16, wherein the interface is further configured to interface a training data repository with the network communicatively coupled to the client device.

18. The non-transitory computer-readable medium of claim 13, wherein the selected predictive model is selected at the predictive modeling server by:
   generating a score for each of the plurality of trained predictive models, where each score represents an estimation of the effectiveness of the respective trained predictive model trained on the training data records; and
   selecting a first trained predictive model from among the plurality of trained predictive models based on the generated scores.

\* \* \* \* \*